Oct. 7, 1924.
E. F. COLLINS ET AL
1,511,050
TEMPERATURE REGULATOR
Filed Feb. 20, 1922
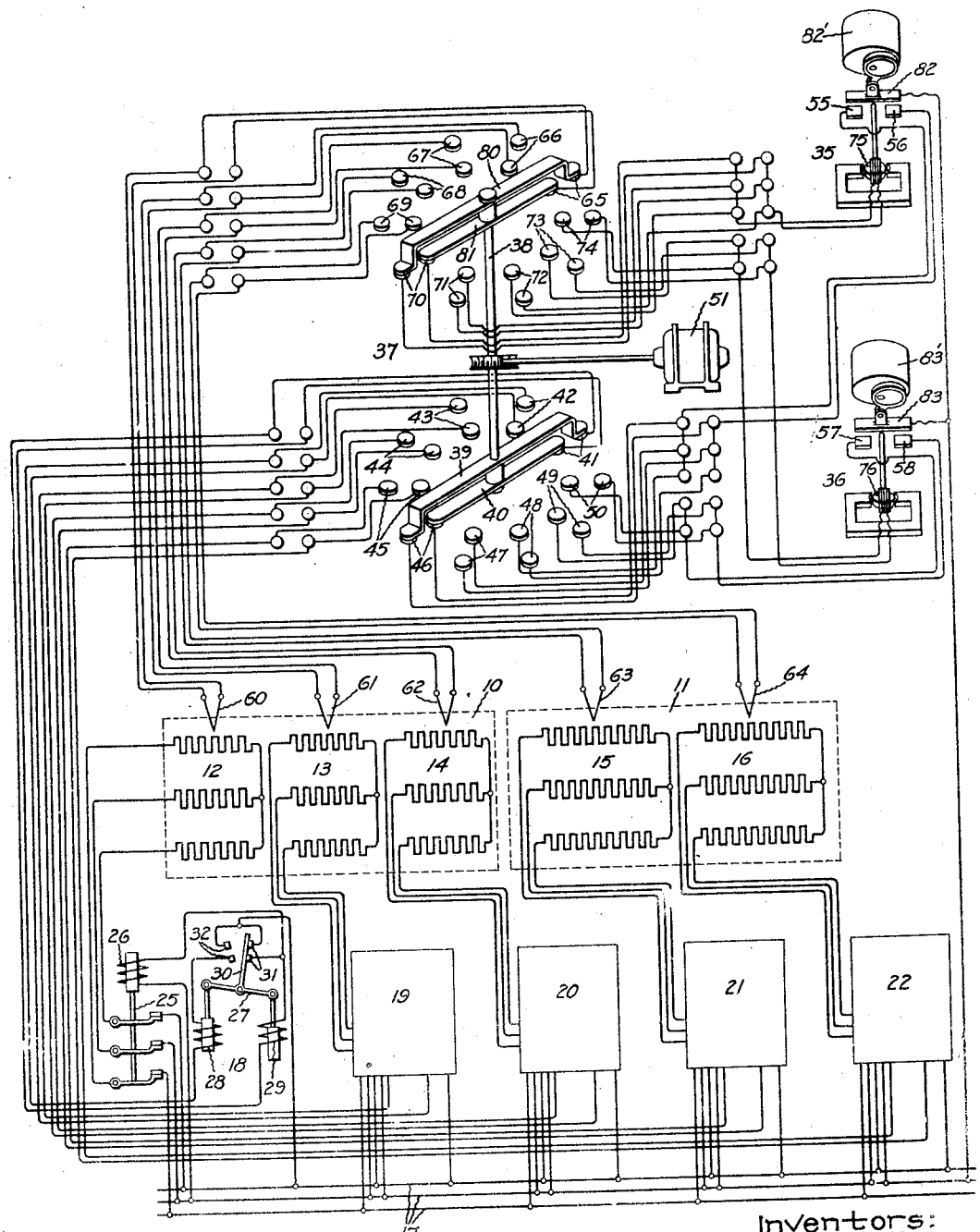
Inventors:
Edgar F. Collins,
Albert N. Otis,
by Albert G. Davis
Their Attorney Patented Oct. 7, 1924.

1,511,050

UNITED STATES PATENT OFFICE.

EDGAR F. COLLINS AND ALBERT N. OTIS, OF SCHENECTADY, NEW YORK, ASSIGNORS TO GENERAL ELECTRIC COMPANY, A CORPORATION OF NEW YORK.

TEMPERATURE REGULATOR.

Application filed February 20, 1922. Serial No. 537,694.

*To all whom it may concern:*

Be it known that we, EDGAR F. COLLINS and ALBERT N. OTIS, citizens of the United States, residing at Schenectady, in the county of Schenectady, State of New York, have invented certain new and useful Improvements in Temperature Regulators, of which the following is a specification.

Our invention relates to temperature regulators for electrically heated apparatus, such as for electric furnaces and the like, and has for its object the provision of improved means for throwing the heating load on and off the power supply circuit in response to changes in temperature.

In the operation of electric furnaces requiring a considerable amount of power, such as furnaces for hardening and drawing metallic articles, considerable difficulty may be experienced with the usual type of temperature regulating system in which the temperature is regulated by throwing on and off portions of the heating load, and in which there is a possibility of a number of portions being thrown on or off at one time. Such a condition may arise also in case a number of separate furnaces are connected to the same supply source. The throwing on or off of a considerable amount of heating load results in shocks on the electric generating equipment and causes various other undesirable characteristics, such as fluctuations in the voltage of the electric supply circuit.

In carrying out our invention we arrange the temperature responsive control in such a way that only one portion of the total heating load can be thrown on or off the supply circuit at one time. In this manner shocks on the generating equipment are avoided. In one embodiment of our invention we provide a selector switch which is continuously rotated and adapted to connect the temperature responsive control means in operative relation with the portions of the heating load successively so that the portions may be separately thrown on or off the power circuit with appreciable intervals of time between, whereby the generating equipment is given an opportunity to adjust itself to each change in load.

For a more complete understanding of our invention reference should be had to the accompanying drawing in the single figure of which is shown in diagramatic form a system of control for electric furnaces embodying our invention.

Referring to the drawing, we have shown our invention in one form as applied to the control of two electric furnaces 10 and 11 which may be independent furnaces or a group of furnaces, through which the charge or work may be conveyed in succession. These furnaces may be maintained at the same temperature or at different temperatures as desired and, obviously, one furnace only or more than two furnaces may be used. The furnace 10 is provided with three electric heaters 12, 13 and 14, while furnace 11 is provided with two heaters 15 and 16. The heaters may be of the resistance type and are each shown as consisting of three resistance elements connected in a Y connection for operation on a three-phase source of electrical supply 17. Within the meaning of our invention, the electric heaters instead of being grouped in one or more furnaces may each be located in a separate furnace.

The connection of each of the resistance heaters 12 to 16, inclusive, with the supply source 17 is effected through control devices 18 to 22 inclusive of a well known type disclosed in U. S. patent to Edgar F. Collins, No. 1,391,996, dated September 27, 1921. Control device 18, only, has been shown in detail, but it will be understood that control devices 19 to 22 inclusive are similar to control device 18. Control device 18 comprises a switch 25 for connecting and disconnecting resistance 12 to the supply source 17. This switch is actuated by an operating coil 26, the energization of which is controlled by means of a relay 27 which is adapted to be thrown to one or the other of two circuit closing positions by means of operating coils 28 and 29. When thrown to the position shown in the drawing upon the energization of coil 28, contact arm 30 of the relay bridges a pair of stationary contacts 31, while, when thrown to its opposite position upon the energization of coil 29, contact arm 30 bridges a pair of stationary contacts 32.

The relay operating coils 28 and 29 of the control devices 18, 19 and 20 are controlled by a suitable temperature responsive device 35 of the type, for example, disclosed in the previously mentioned patent to Collins. A similar temperature responsive device 36 is provided for control devices 21 and 22.

These temperature responsive devices are connected by means of a rotary selector switch 37 successively to the resistance control devices which they are designed to govern. Switch 37 comprises an operating shaft 38 carrying on its lower end insulated electrically conducting arms 39 and 40 which are adapted to cooperate with pairs of symmetrically arranged stationary contacts 41 to 50 inclusive. These pairs of contacts are arranged around the periphery of a circle having for its center the shaft 38, each pair of contacts lying in a radius of this circle. Shaft 38 is rotated continuously at a suitable slow speed by means of a constant speed driving means, such as an electric motor 51, and thus moves contact arms 39 and 40 successively over the pairs of stationary contacts. As the contact arms move over the stationary contacts, it will be observed that the outer diametrically opposite stationary contacts are electrically connected momentarily by arm 39, while the inner diametrically opposite stationary contacts are electrically connected momentarily by contact arm 40. The pairs of stationary contacts 41 to 45 inclusive are connected respectively to the relay operating coils of control devices 18 to 22 inclusive. The inner contacts of pairs 46 to 48 inclusive are electrically connected to stationary contact 55 of temperature responsive device 35, the outer contacts of these pairs to stationary contact 56 of the temperature responsive device, the inner contacts of pairs 49 and 50 to stationary contact 57 of temperature responsive device 36, and the outer contacts of these pairs to stationary contact 58. It will thus be observed that as contact arms 39 and 40 are rotated, the relay operating coils of the resistance control devices 18 to 22 inclusive will be connected successively so as to be subject to control by temperature responsive devices 35 and 36 in the relation previously described.

In one form of our invention thermocouples 60 to 64 inclusive are provided respectively for the sections of the furnaces heated by resistances 12 to 16 inclusive, the terminals of which are electrically connected to stationary contacts 65 to 69, inclusive, symmetrically arranged around shaft 38 together with similar pairs of stationary contacts 70 to 74 inclusive. The pairs of contacts 70 to 72 inclusive are connected to the moving element 75 of temperature responsive device 35, while the pairs of contacts 73 to 74 inclusive are connected to the moving element 76 of temperature responsive device 36. Contact arms 80 and 81 similar to contact arms 39 and 40 are secured to the upper end of shaft 38 so as to be rotated by the shaft successively into engagement with the pairs of spaced contacts 65 to 74 inclusive. In this manner thermocouples 60, 61 and 62 are momentarily and periodically connected by contact arms 80 and 81 to the moving element 75 of temperature responsive device 35, while thermocouples 63 and 64 are momentarily and periodically connected to moving element 76 of temperature responsive device 36.

Switch 37 is thus arranged to connect one or the other of the temperature responsive devices 35 and 36 to both the thermocouple and the relay operating coils corresponding to any particular resistance heater at the same time. For example, as shown in the drawing, thermo-couple 60 is connected to moving element 75 at the same time that stationary contacts 55 and 56 are connected to operating coils 28 and 29 of relay 27.

As thus constructed and arranged, the operation of our invention is as follows: The temperature responsive devices 35 and 36 may be set to maintain the same temperature or different temperatures as desired. When the furnace sections are operating at the predetermined mean working temperature, the pointers carried by moving elements 75 and 76, as the temperature responsive devices are connected by rotating switch 37 to their various thermocouples, will be moved to positions between their respective stationary contacts 55, 56 and 57, 58, as shown in the drawing, and will therefore not be pinched by their respective reciprocating contacts 82 and 83, shown as driven by electric motors 82' and 83', to close the relay control circuits. None of the relays will therefore be operated under these conditions. Upon a rise of temperature in any one of the sections to the predetermined maximum value, the pointer carried by the corresponding moving element 75 or 76, as the case may be, will be pinched between contacts 82, 56 or 83, 58. When switch 37, for example, reaches the position shown in the drawing, should the section of the furnace heated by resistance 12 be at the predetermined maximum temperature the temperature responsive device 35 will close a circuit for operating coil 29 of relay 27, throwing the relay to its opposite position whereby arm 30 opens the circuit for coil 29 and also for coil 26. Switch 25 thereupon drops out, disconnecting resistance 12 from the supply source. If the temperature of the furnace sections heated by resistance heaters 13 and 14 should also have increased to the predetermined maximum temperature, they will be similarly disconnected individually through control devices 19 and 20 upon the successive connection thereto of temperature responsive device 35 as selector switch 37 rotates. In like manner resistances 15 and 16 will be disconnected by temperature responsive device 36. As the temperature of any furnace section decreases now and reaches the predetermined minimum value, then pointer 75 or 76 will be pinched between contacts 82, 55 or 83, 57, whereby its control relay will be thrown back to the position shown in the drawing, again connecting the corresponding resistance to the supply circuit. The heaters are thus controlled so as to maintain a predetermined mean working temperature in each of the furnaces.

It will be observed that should each section of the furnace be provided with temperature control means, it would be possible in case several or all of the sections should reach the predetermined maximum or minimum temperature at the same time for a number of heaters to be thrown on or off together, which would cause a shock to the power supply system as previously pointed out. With our invention, however, it is impossible for more than one portion of the heating load to be thrown on or off at one time.

While we have described our invention as embodied in concrete form and as operating in a specific manner in accordance with the provisions of the patent statutes, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States, is:—

1. In a temperature regulator, the combination with a plurality of electric heaters, of a source of electrical supply for said heaters, and temperature responsive control means for connecting said heaters to said supply source separately at intervals upon the occurrence of a predetermined minimum temperature and for disconnecting said heaters separately at intervals upon the occurrence of a predetermined maximum temperature.

2. In a temperature regulator, the combination with a plurality of electric heaters, of a temperature responsive control device, and selective means for periodically connecting said control device to operate in conjunction with each of said heaters whereby said heaters are separately controlled so as to maintain a predetermined temperature.

3. In a temperature regulator, the combination with a plurality of electric heaters, a control device for each of said heaters, temperature responsive means, and selective switching means for connecting said temperature responsive means to said control devices in sequence whereby said heaters are individually controlled so as to maintain a predetermined temperature.

4. In a temperature regulator, the combination with a plurality of electric heaters, an electromagnetically actuated switch in the electrical supply circuit to each of said heaters, a temperature responsive control device for said switches, and selective switching means for connecting said control device to said switches in sequence, whereby said heaters are individually controlled to maintain a predetermined temperature.

5. In a temperature regulator, the combination with a plurality of electric heaters, relays for controlling the electrical supply circuit to each of said heaters, temperature responsive means associated with each of said heaters, a relay control device actuated by said temperature responsive means, and selective switching means for electrically connecting said control device to the temperature responsive means and the relay of each of said heaters in sequence.

6. In a temperature regulator, the combination with a plurality of electric heaters, thermocouples associated with said heaters, independently operable switches in the circuits of said heaters, electromagnetic means for controlling the opening and closing of said switches, a circuit controlling device arranged to be controlled by said thermocouples, and continuously operating selective switching means for connecting the thermocouple and switch controlling means of each heater in sequence to said circuit controlling device whereby said heaters are separately controlled to maintain a predetermined temperature.

In witness whereof, we have hereunto set our hands this 19th day of February, 1922.

EDGAR F. COLLINS.
ALBERT N. OTIS.